H. KRUESHELD.
ELECTRIC COOKING UTENSIL.
APPLICATION FILED FEB. 1, 1921.
1,405,043.
Patented Jan. 31, 1922.
2 SHEETS—SHEET 1.
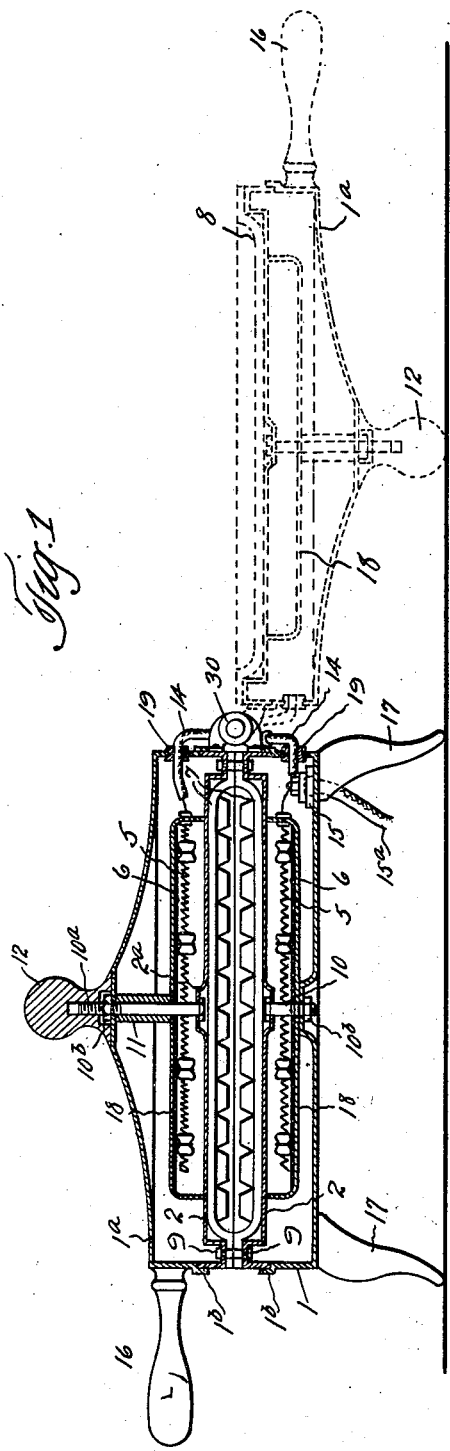
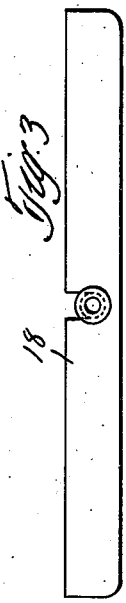
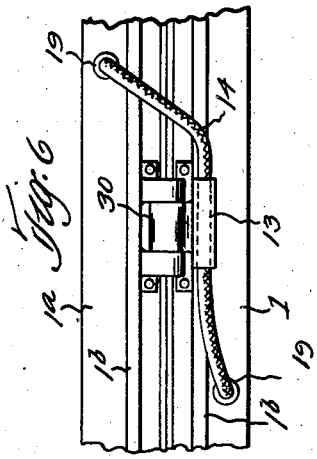
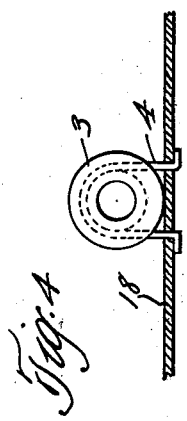
Inventor
Henry Kruesheld
By John A. Bomhardt
Atty.

H. KRUESHELD.
ELECTRIC COOKING UTENSIL.
APPLICATION FILED FEB. 1, 1921.
1,405,043.
Patented Jan. 31, 1922.
2 SHEETS—SHEET 2.
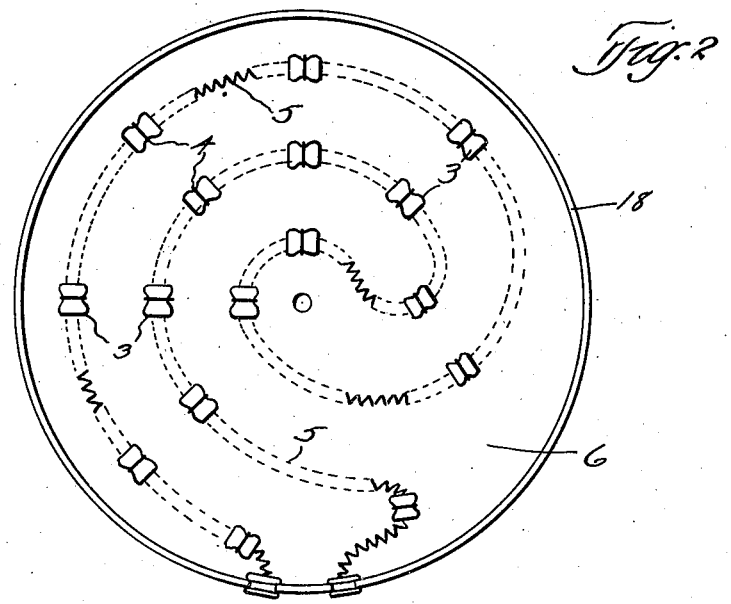
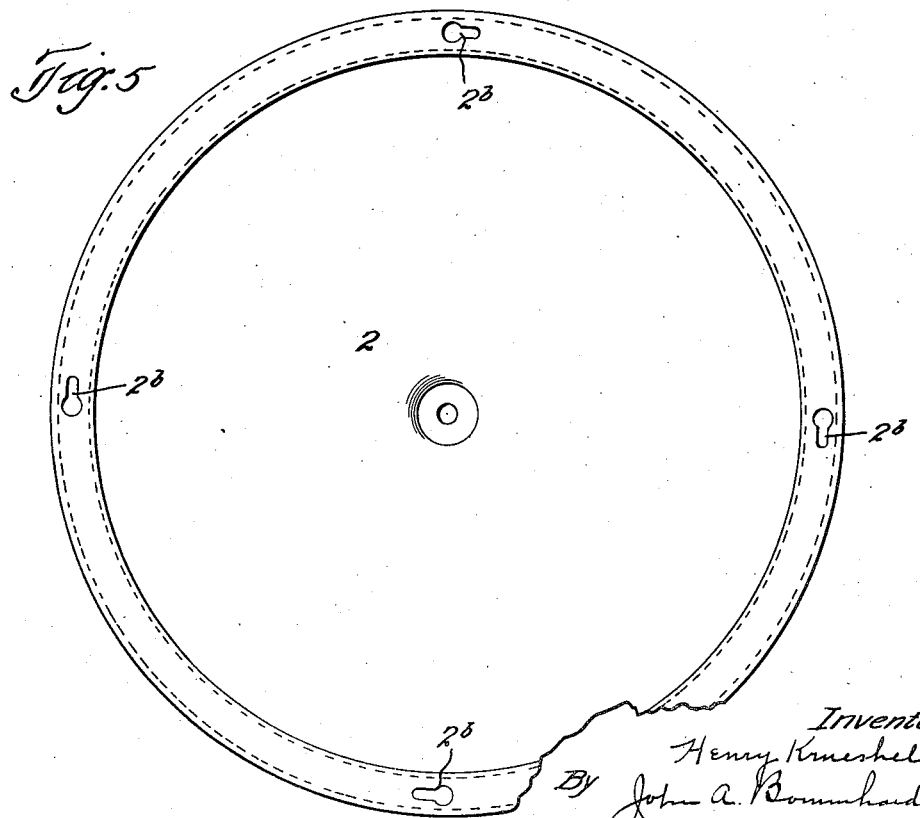
Inventor
Henry Kruesheld
By John A. Bornhardt
Atty.

UNITED STATES PATENT OFFICE.

HENRY KRUESHELD, OF NEW WASHINGTON, OHIO, ASSIGNOR TO THE PERFECTION ELECTRIC PRODUCTS CO., OF NEW WASHINGTON, OHIO, A CORPORATION OF OHIO.

ELECTRIC COOKING UTENSIL.

1,405,043.     Specification of Letters Patent.     Patented Jan. 31, 1922.

Application filed February 1, 1921. Serial No. 441,526.

*To all whom it may concern:*

Be it known that I, HENRY KRUESHELD, a citizen of the United States, residing at New Washington, in the county of Crawford and State of Ohio, have invented certain new and useful Improvements in Electric Cooking Utensils, of which the following is a specification.

This invention relates to electrically heated cooking utensils, and has for its object to provide a device of this kind which can be converted from one kind of a utensil to another. For example, it can be converted from a waffle baker to a griddle or the like, or to a toaster.

The device is so arranged that for cooking waffles or the like the upper part can be folded over on the lower part, but for use as a griddle, for instance, the upper part can be swung open to position so that it forms a two-section griddle or hot plate. The plates for cooking waffles can be removed and other plates substituted.

The utensil is also characterized by improvements with respect to the manner of constructing the parts thereof, and to the means for supporting the heating elements and their connections, in such manner as to permit the conversion of the device from one kind of a cooker to another.

In the accompanying drawings, Fig. 1 is a vertical section of the device used as a waffle baker, and showing in dotted lines how the upper part can be opened out to form a griddle or the like. Fig. 2 is a plan of one of the heating coils and the members supporting the same. Fig. 3 is an edge view of the parts shown in Fig. 2. Fig. 4 is a detail showing the manner of supporting the insulators. Fig. 5 is a plan of one of the supporting plates. Fig. 6 is a detail showing the hinge connection between the upper and lower parts.

The utensil comprises a bottom frame 1 and a top frame $1^a$, the former being supported on legs 17. These frames are pan-shaped parts, conveniently pressed from sheet metal, and of substantially the same form except as hereinafter indicated. Each frame has a flange which is offset as indicated at $1^b$ to form a seat to receive the rim of an inner flanged supporting plate 2, which is held in place, in the top and bottom respectively, by the bolts 10 and $10^a$, the heads of which are seated in sockets $2^a$ formed in the plates 2 and the stems of which receive nuts $10^b$ on the outer side of the frame, whereby the frames and the plates are drawn together and held in position, to form a pair of hollow casings in which the heating elements are contained.

The upper frame is provided with a handle 16 at one side and with a knob 12 at the top, which knob, when the top part is swung open, forms a support to hold said part in substantially horizontal position, as shown in dotted lines in Fig. 1. The parts are hinged together as indicated at 30 at a point opposite the handle 16.

Each heating element consists of a coil 5 which is supported within a dished plate 18 which fits against the outer side of the supporting plate 2 where it is held by the bolts 10 and $10^a$ above referred to, a spacer sleeve 11 being interposed in the upper part as shown in Fig. 1. The coils pass through insulators 3 which are suspended from the plates 18 by means of U-shaped wires or rods 4, the legs of which pass through holes in the plate 18, and are bent over to retain the insulators in position. An insulating sheet 6 is preferably located between the coils and each plate.

The leads to the coils extend through a flexible sheath or tube 14, from a terminal block 15 which receives the line wires $15^a$, said sheath being supported by a clip 13 on the hinge member 30 by which the upper and lower parts are hinged together, the sheath passing through insulators 19 set in the flanges of the top and bottom frames.

Within each of the supporting plates 2 is set a plate constructed according to the nature of the cooking operation to be performed. In Fig. 1 I have shown waffle plates 7. These are attached for convenient removal by means of headed lugs 9 carried at the rim of said plates and adapted to be inserted through key-hole slots $2^b$ in the rim of the supporting plates 2. By inserting the lugs through the holes, and then giving a slight turn, the cooking plates are attached to the plates 2, but can be readily removed to be washed, or to substitute a plate of a different kind. Thus in dotted lines in Fig. 1 I show a griddle plate 8 mounted in the open upper part of the utensil. Or when opened out both parts of the utensil can be used as a hot plate, for toasting, or for heating any kind of a vessel 11 placed thereon. The construction permits the quick and easy change from one kind of a cooker to another by the mere substitution of inner plates of different types. It is also easy to assemble or disassemble the parts by removing either bolt 10 or 10ª, which permits the members to be separated or detached from each other.

By the means described a cooker of one kind can be readily changed to another kind, which will be found very useful and avoids the expense of separate utensils for different purposes.

I claim:

1. An electric cooking utensil comprising top and bottom sections hinged together, each section comprising spaced plates joined at their rims, and an electric heating element contained in the space between said plates, in each section.

2. An electric cooking utensil comprising top and bottom sections hinged together, each section comprising spaced plates joined at their rims, and an electric heating element contained in the space between said plates, in each section, the top section being provided with a knob to support the same in horizontal position when opened.

3. An electric cooking utensil comprising top and bottom sections hinged together, each section having inner and outer spaced plates and a heating element therebetween, and a removable cooking plate detachably mounted on the inner plate, whereby cooking plates of different kinds may be substituted.

4. An electric cooking utensil comprising top and bottom sections hinged together, each section having inner and outer plates and a heating element therebetween, the inner plate having slots, and a removable cooking plate adapted to be attached to each inner plate and having lugs engageable in said slots.

5. An electric heater having a casing consisting of flanged plates spaced apart and joined at the flanges, a bolt connecting said plates, and a heating element confined by the bolt, in the space between the plates.

6. An electric heater having a hollow casing consisting of spaced plates, a heating element consisting of a dished plate with a coil therein, between the said plates, and a bolt extending through all of said plates and clamping the same together.

7. A heating unit for an electric heater, comprising a dished plate, a coil therein, insulators through which the coil extends, and fastening devices between the insulators and the plate, said fastening devices comprising U-shaped wires extending around the insulators and extending at their ends through holes in the plate.

8. An electric heater comprising a casing consisting of spaced inner and outer plates having flanges at their edges joined to form a hollow casing, a dished plate in said space, a heating coil in said dished plate, and a bolt connecting the inner and outer plates and extending through the dished plate and clamping all said plates in position.

In testimony whereof, I do affix my signature in presence of two witnesses.

HENRY KRUESHELD.

Witnesses:
F. H. SPILLETTE,
R. C. ALT.